United States Patent
Munch et al.

(10) Patent No.: US 7,503,580 B2
(45) Date of Patent: Mar. 17, 2009

(54) VEHICLE OCCUPANT PROTECTION SYSTEM WITH DISABLE MODE

(75) Inventors: Carl A. Munch, Troy, MI (US); Raad Konja, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 318 days.

(21) Appl. No.: 10/977,193

(22) Filed: Oct. 29, 2004

(65) Prior Publication Data

US 2006/0091652 A1    May 4, 2006

(51) Int. Cl.
B60R 21/16    (2006.01)
(52) U.S. Cl. ..................................... 280/735
(58) Field of Classification Search ................. 180/438, 180/274, 282; 280/282, 735; 307/10.1; 340/438; 701/45
See application file for complete search history.

(56) References Cited

U.S. PATENT DOCUMENTS

| | | | |
|---|---|---|---|
| 5,165,717 A | | 11/1992 | Tanaka |
| 5,330,226 A | * | 7/1994 | Gentry et al. ............... 280/735 |
| 5,825,098 A | * | 10/1998 | Darby et al. ................ 307/10.1 |
| 5,879,024 A | | 3/1999 | Estep |
| 5,892,433 A | * | 4/1999 | Fulda .......................... 340/438 |
| 6,088,639 A | * | 7/2000 | Fayyad et al. .................. 701/45 |
| 6,133,648 A | * | 10/2000 | Titus et al. .................. 307/10.2 |
| 6,145,874 A | | 11/2000 | Modzelewski et al. |
| 6,189,923 B1 | | 2/2001 | Tsubone |
| 6,382,660 B1 | | 5/2002 | Starner et al. |
| 6,433,681 B1 | | 8/2002 | Foo et al. |
| 6,439,602 B2 | * | 8/2002 | Cox et al. .................... 280/735 |
| 6,600,414 B2 | | 7/2003 | Foo et al. |
| 6,672,615 B2 | | 1/2004 | Mattes et al. |
| 2002/0004694 A1 | * | 1/2002 | McLeod et al. ............... 701/29 |
| 2003/0196495 A1 | * | 10/2003 | Saunders et al. ....... 73/862.041 |

FOREIGN PATENT DOCUMENTS

| | | |
|---|---|---|
| DE | 42 17 172 A1 | 11/1993 |
| DE | 199 02 993 A1 | 9/1999 |
| DE | 198 27 557 A1 | 12/1999 |
| WO | WO 02/092396 A1 | 11/2002 |

* cited by examiner

*Primary Examiner*—Eric Culbreth
*Assistant Examiner*—Joseph Rocca
(74) *Attorney, Agent, or Firm*—Tarolli, Sundheim, Covell & Tummino LLP

(57) ABSTRACT

A system (10) for helping to protect an occupant of a vehicle (12) includes a vehicle occupant protection device (20). An event sensor (14) is operative to sense a vehicle event condition such as a vehicle crash or rollover and provides a vehicle event condition signal (22) indicative of the sensed vehicle condition. A vehicle operating condition sensor (18) senses vehicle operation conditions such as ignition starts, vehicle speed, etc. A controller (16) is operative to determine the occurrence of a vehicle event in response to the vehicle condition signal (22). The controller (16) is operative to provide an actuation signal (24) for actuating the vehicle occupant protection device (20) in response to determining the occurrence of the vehicle event. A software key (100) is provided having a disable mode (106) in which the controller (16) is inhibited from providing the actuation signal (24). The software key is responsive to the signals from the vehicle operating sensors (18).

2 Claims, 1 Drawing Sheet

VEHICLE OCCUPANT PROTECTION SYSTEM WITH DISABLE MODE

TECHNICAL FIELD

The present invention relates to an occupant protection system and, more particularly, to a vehicle occupant protection system having a disable mode.

BACKGROUND OF THE INVENTION

It is known to provide actuatable vehicle occupant protection devices for helping to protect a vehicle occupant upon the occurrence of a vehicle event for which occupant protection is desired. To detect such a vehicle event, a vehicle may be equipped with one or more sensors that detect vehicle event conditions and provide signals indicative of the vehicle event conditions. The event sensors are connected to a controller that evaluates the event sensor signals to detect the occurrence of the vehicle event. Upon determining the occurrence of a particular type of vehicle event, e.g., a vehicle crash or vehicle roll-over, the controller provides a signal for actuating the vehicle occupant protection devices.

Actuatable vehicle occupant protection devices include inflatable restraints such as inflatable side curtains, front air bags, and side air bags. Other actuatable occupant protection devices include pretensioners, head restraints, and knee bolsters. For inflatable devices, the controller provides a signal for actuating an inflation fluid source associated with the inflatable device. When actuated, the inflation fluid source provides inflation fluid for inflating the device to the deployed position.

The event sensors and the controller for evaluating the event sensor signals for controlling the actuatable devices may be located together in a single assembly unit or may be separated and connected for communication via wires when assembled in the vehicle.

SUMMARY OF THE INVENTION

In accordance with the present invention, a system is provided for helping to protect an occupant of a vehicle. The system includes a vehicle operating condition sensor for sensing an operating condition of the vehicle. The operating condition of the vehicle includes vehicle speed, vehicle ignition cycles, or both. The vehicle operating condition sensor provides a vehicle operating condition signal indicative of the sensed operating condition of the vehicle. The system also includes a controller that monitors the vehicle operating condition signal and controls a vehicle occupant protection device in response thereto.

In accordance with another aspect of the present invention, a system is provided for helping to protect an occupant of a vehicle. The system includes a vehicle operating condition sensor for sensing an operating condition. The operating condition includes a ground detection with the system. The vehicle operating condition sensor provides a vehicle operating condition signal indicative of the sensed operating condition of the vehicle. The system also includes a controller that monitors the vehicle operating condition signal and controls a vehicle occupant protection device in response thereto.

In accordance with another aspect of the present invention, a method is provided for helping to protect a vehicle occupant. The method includes the step of sensing an operating condition of the vehicle. The operating condition includes vehicle speed, vehicle ignition cycles, or both. The method also includes providing a vehicle operating condition signal indicative of the sensed operating condition. The method further includes controlling operation of a vehicle occupant protection device in response to the vehicle operating condition signal.

In accordance with yet another aspect of the present invention, a computer readable medium is provided having computer executable instructions for determining an operating condition of a vehicle. The operating condition includes vehicle speed, vehicle ignition cycles, or both. The computer executable instructions also provide an actuation signal for actuating a vehicle occupant protection device in response to the operating condition of the vehicle.

BRIEF DESCRIPTION OF THE DRAWINGS

The foregoing and other features and advantages of the invention will become apparent to one skilled in the art upon consideration of the following description of an exemplary embodiment of the invention and the accompanying drawings, in which.

DESCRIPTION OF EMBODIMENTS

Figure 1:
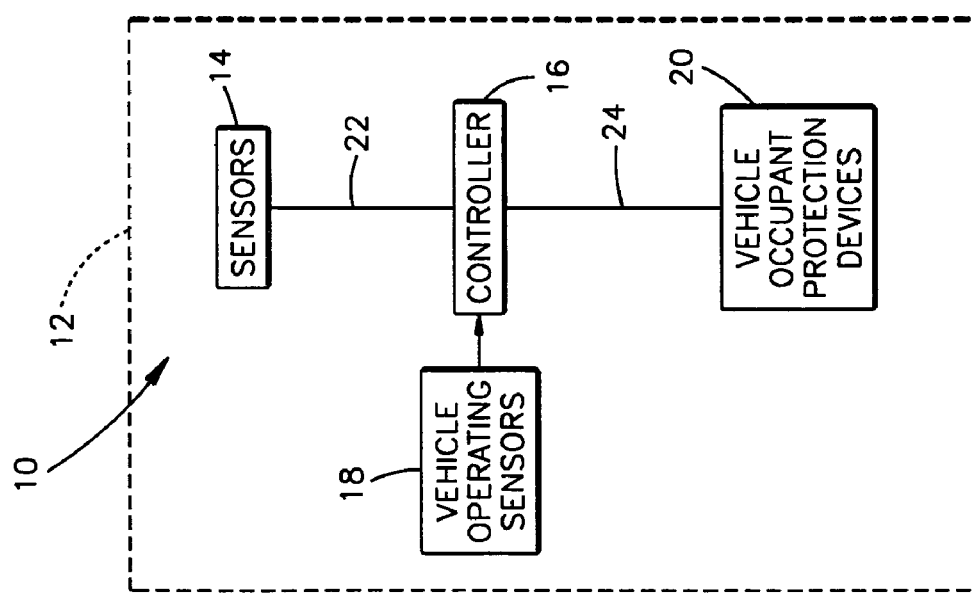
FIG. 1 is a schematic block diagram of a vehicle occupant protection system in accordance with an exemplary embodiment of the present invention.

FIG. 1 illustrates a system 10 for helping to protect occupant(s) (not shown) of a vehicle 12 in accordance with one exemplary embodiment of the present invention. The vehicle occupant protection system 10 is mountable in the vehicle 12. The system 10 includes one or more vehicle occupant protection devices 20 actuatable to help protect the occupant(s) of the vehicle 12. The system 10 also includes one or more event sensors 14 for sensing vehicle event conditions for which it may be desirable to actuate devices 20 to help protect the occupant(s). The system 10 further includes a controller 16 operatively connected to the event sensors 14 and the vehicle occupant protection devices 20. Vehicle operating sensors 18 are also connected to the controller 16. In the embodiment illustrated in FIG. 1, a single controller 16 is operatively connected to vehicle event sensors 14, the vehicle operating sensors 18, and vehicle occupant protection devices 20.

The vehicle event conditions sensed by the event sensors 14 can be any event conditions that may be associated with a vehicle event for which actuation of the vehicle occupant protection device 20 may be desired. For example, actuation of the vehicle occupant protection device 20 may be desired in a vehicle event such as a vehicle collision event (e.g., a front impact, a side impact, a rear impact, an angled impact, or an offset impact), a vehicle rollover event, and/or a combination of such events, etc. For the purpose of describing the embodiment of FIG. 1, vehicle operating conditions sensed by the sensors 14 can be conditions associated with a vehicle collision, a vehicle rollover, or both.

The controller 16 is operative to receive vehicle event signals 22 from the sensors 14. The vehicle event signals 22 are indicative of the vehicle event conditions sensed by the sensors 14 such as crash acceleration, vehicle roll, etc. The controller 16 is operative to evaluate the vehicle event signals 22 from the sensors 14 to detect or otherwise determine the occurrence of a vehicle event or events for which actuation of the vehicle occupant protection devices 20 is desired. If the controller 16 determines the occurrence of one or more such vehicle events for which activation is desired, the controller provides appropriate actuation signals 24 to appropriate (one or more) vehicle occupant protection devices 20 at appropriate times to actuate the desired protection devices to help protect the vehicle occupant. Such devices may include seat belt pretensioners, knee bolsters, frontal air bags, side air bags, side curtains, etc. The actuation times may be simultaneous or staggered. The air bags may be multi-stage air bags.

The controller 16 may include one or more electronic devices suited to perform the control functions described herein. For example, the controller 16 may include one or more microcontrollers, microprocessors, state machines, discrete components, one or more application specific integrated circuits ("ASIC"), or a combination thereof. The controller 16 functions to receive the event sensor signals 22 from the sensors 14, evaluates the vehicle event conditions indicated by the event sensor signals 22, and actuate the appropriate vehicle occupant protection devices 20 via signals 24 at the appropriate times. The function of the controller 16 may be implemented as software or a combination of hardware and software.

In accordance with the present invention, a safing function is provided to help prevent undesired actuation of the protection devices 20 during shipping and assembly of the system into a vehicle 12. The safing function, in accordance with the present invention, may also be desirable during maintenance of the system 10 and/or upon detection of a system error within the system 10 during self-diagnostic testing.

According to the present invention, a safing function is provided via a software key that is implemented in the system 10 to help lock-out activation of the system and thereby prevent undesired actuation. By "software key" it is meant any internal command process that locks out the performance of selected functions. The "software key," may implemented in code or instruction for providing the desired safing function described herein. In the embodiments illustrated in FIG. 1, the software key is implemented within the controller 16. The software key could, however, be implemented in any component of the system 10 capable of executing the computer implemented instructions contained therein.

The software key has an enable mode in which the controller 16 is permitted to actuate the protection device 20 in response to certain vehicle event conditions sensed by the sensors 14. The software key also has a disable mode in which the controller 16 is inhibited from actuating the protection device 20 in response to vehicle event conditions sensed by the sensors 14. In the disable mode, an indication, such as a warning lamp on the vehicle instrument panel, an audible alarm, or both is provided to the vehicle operator. Such indication may, for example, indicate to the operator that maintenance or diagnostics is required.

To help ensure the robustness of the software key, the software key can be programmed at multiple points in the memory such as non-volatile random access memory ("NVRAM") of the controller 16. To do so, a software key code may be partitioned such that certain operations are performed in different memory areas of the controller 16. Conditional flags may be set at each memory location and the software key placed in the enable mode or disable mode in response to the condition of the flags. This prevents the controller 16 jumping to a space in memory and beginning a sequential execution, which could provide a false enable or disable of the software key. This technique also helps prevent a single byte corruption or page corruption in the memory space of the controller.

Figure 2:
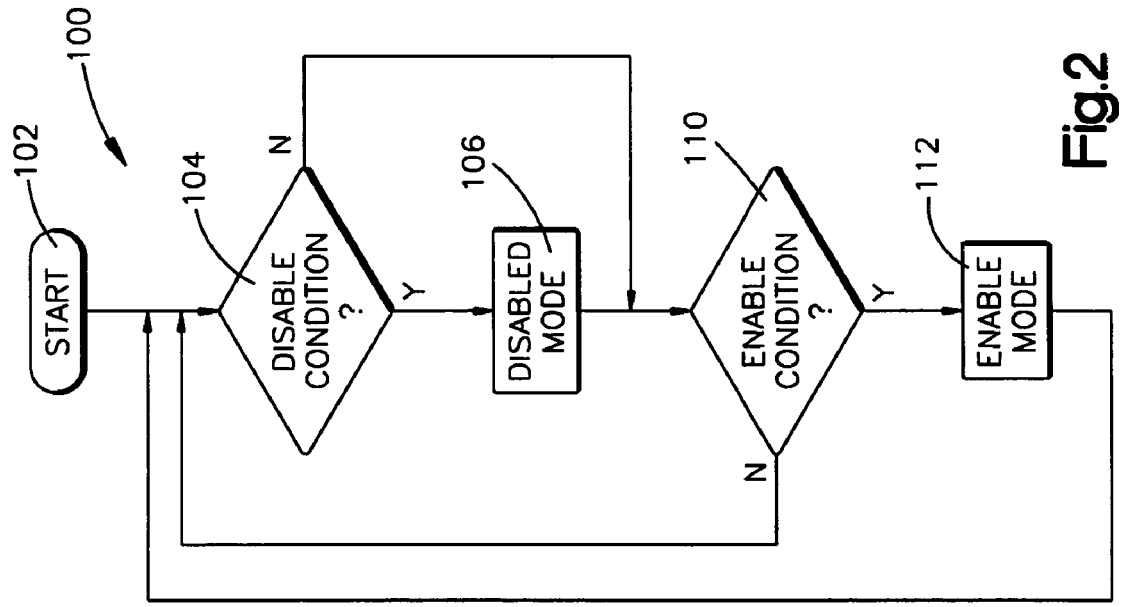
FIG. 2 is a flow diagram illustrating a control process in accordance with an exemplary embodiment of the present invention for use with the system of FIG. 1.

Referring to FIG. 2, the software key process 100, in accordance with an exemplary embodiment of the present invention, begins at step 102, such as occurs at system power-up, in which parameters are initiated and flag conditions are set to their initial starting values. The software key process 100 proceeds to step 104 in which a determination is made as to whether or not there exists a disable condition that requires placing the controller 16, and, in turn, the system 10, in the disable mode. A disable condition may exist for a variety of predetermined vehicle operating conditions. For example, a disable condition may be desirable in a situation after the controller 16 and sensors are assembled into a single unit and programmed but before installation of the assembled unit in the vehicle 12. After assembly and testing of the controller 16 and sensors 14 as a unit, it is desirable to software lock them until after final assembly in the vehicle. This would be accomplished via a final command as part of the diagnostic testing of the controller and sensors via a command to the controller 16 at the time of assembly of the system 10 outside of the vehicle 10. If each of the portions of the system 10 are separately manufactured, the controller 16, after it is loaded with its program, is software locked prior to when it is installed in the vehicle 12 and prior to all other connections being made to the sensors 14 and 18 and to the protection devices 20. The controller software may, for example, include an internal "installation incomplete" software key that, in effect, software locks itself internally once the controller 16 is installed in the vehicle 12 and the controller recognizes the initial installation event, i.e., it is first placed in a vehicle. This can be accomplished in any of several ways well within the skill of those in the art. One example of detection of initial installation sensing could be a continuity check or a connection to ground check. Also, other signal processing or internal sensors may be used. This self-locking during first installation will prevent actuation of any of the actuatable devices when the sensors are being connected to it.

As another example, a disable condition may be desirable in a situation where vehicle service or maintenance is being performed that involves the controller 16 or any other components of the system 10, such as the sensor(s) 14 or vehicle occupant protection device(s) 20. In this situation, the software of controller 16 may be programmed to determine a disable condition in response to an external input via, for example, a vehicle diagnostics terminal communicating with the controller 16 via a communication bus of the vehicle (not shown). The controller software may, for example, include a "maintenance" software key that is locked via the vehicle computer talking with the controller 16.

As another example, a disable condition may be set for certain internal functions of the controller 16 itself. In this situation, the controller software may be programmed to determine a disable condition in response to the controller 16 performing initialization functions, such as occur during start-up. For example, the controller 16 may perform certain initialization procedures every time the vehicle ignition is actuated and the system 10 is powered-up. The controller 16 may also be programmed to perform self-testing or self-diagnostics functions. During these times, or for certain portions thereof, the disable condition may exist. As a further example, a disable condition may exist in a situation where controller 16 has detected a fault, either internal or external to the system 10. In this situation, the controller software may be programmed to determine a disable condition in response to the detected fault condition.

If a disable condition is detected at step 104, the software key process 100 proceeds to step 106 and the software key is placed in the disable mode. In the disable mode, the controller 16 is inhibited from responding to conditions sensed by the event sensor(s) 14 and from actuating the vehicle occupant protection device(s) 20. Visual indication and/or audible indication of the disable mode is provided to the vehicle operator. Once the software key is placed in the disable mode at step 106, the software key process 100 proceeds to step 110 in which a determination is made as to whether an enable condition exists. An enable condition may exist in a variety of circumstances.

For example, an enable condition may be determined in a situation where, after installation or maintenance of the system 10 or vehicle 12, the person performing the installation or maintenance wishes to enable the controller 16 to enable the system 10 for normal operation. As a result, for example, an "installation complete" or "maintenance complete" software latch may be latched manually by the installer or maintenance person. This operation may be performed, for example, via an external input, such as through a computer, e.g., a vehicle diagnostics terminal or other communication device connected to the vehicle communication bus.

As another example, an enable condition may be determined to exist (i.e., a positive determination in step 110) after the correcting a system fault. A fault correction flag may be manually reset, for example, through a computer or diagnostics terminal, or automatically reset via the diagnostics program.

As another example, an enable condition may be determined to exists (i.e., a positive determination in step 110) in response to the occurrence of a predetermined vehicle condition such as installation of the system 10 into the vehicle or maintenance of the system 10 or vehicle 12. Such predetermined vehicle conditions may be determined by the controller 16 via connections with a communication bus (not shown) of the vehicle 12 or other sensors connected with the vehicle. For example, the controller 16 may determine an enable condition in response to an ignition system of the vehicle 12 being powered on. In this example, the controller 16 may determine an enable condition in response to the ignition system being powered on or after a predetermined number of times, e.g., after three times. In this example, sensor 18 would include a sensor monitoring the vehicle ignition power. As another example, the controller 16 may determine an enable condition in response to the vehicle 12 traveling at a predetermined vehicle speed, e.g., five miles per hour. In this example, sensor 18 would include a vehicle speed sensor.

As a further example, an enable condition may be determined in response to hardware connections of the system 10. For example, the controller 16 may determine an enable condition in response to establishing an electrical ground connection when the system 10 is installed in the vehicle 12. In this example, the controller 16 would monitor for a ground connection either directly or through a sensor such as a sensor 18.

If an enable condition (i.e., an affirmative determination is detected at step 110), the software key process 100 proceeds to step 112 and the software key is placed in the enable mode. When the software key is in the enable mode, the controller 16 is enabled to respond to sensed vehicle conditions determined via the sensor(s) 14 and actuate the vehicle occupant protection device(s) 20. The process then returns to step 104.

From the above description of the invention, those skilled in the art will perceive improvements, changes and modifications. Such improvements, changes and modifications within the skill of the art are intended to be covered by the appended claims.

Having described the invention, the following is claimed:

1. A system for helping to protect an occupant of a vehicle, said system comprising:
    a vehicle operating condition sensor for sensing an operating condition of the vehicle including at least one of vehicle speed and vehicle ignition cycles and providing a vehicle operating condition signal indicative thereof; and
    a controller having a disable mode in which said controller is inhibited from providing a signal to actuate said vehicle occupant protection device, said controller being initially placed in said disable mode prior to assembly into the vehicle, said controller, after assembly into the vehicle, monitoring the vehicle operating condition signal and said controller being responsive to said monitored vehicle operating condition signal for automatically switching said controller from said disable mode to an enable mode so as to permit actuation of the vehicle occupant protection device.

2. A method for helping to protect a vehicle occupant, said method comprising the steps of:
    sensing an operating condition of the vehicle including at least one of vehicle speed and vehicle ignition cycles and providing a vehicle operating condition signal indicative thereof; and
    controlling operation of a vehicle occupant protection device including initially disabling operation of said vehicle occupant protection device prior to assembly into the vehicle, and, after assembly of said vehicle occupant protection device into the vehicle, monitoring the vehicle operating condition signal and, responsive to said monitored vehicle operating condition signal, automatically switching to an enable mode so as to permit actuation of the vehicle occupant protection device in response to said vehicle operating condition signal.

* * * * *